(12) United States Patent
Ohtsubo et al.

(10) Patent No.: US 7,517,019 B2
(45) Date of Patent: Apr. 14, 2009

(54) VEHICLE DRIVING POSTURE ADJUSTING DEVICE

(75) Inventors: Tomonori Ohtsubo, Fuchu-cho (JP); Hiroki Uemura, Fuchu-cho (JP); Toshimine Morino, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 90 days.

(21) Appl. No.: 11/704,294

(22) Filed: Feb. 9, 2007

(65) Prior Publication Data
US 2007/0205626 A1 Sep. 6, 2007

(30) Foreign Application Priority Data
Feb. 15, 2006 (JP) ............... 2006-037597

(51) Int. Cl.
*B60N 2/00* (2006.01)
*B60N 2/02* (2006.01)
(52) U.S. Cl. .................... 297/341; 297/344.1
(58) Field of Classification Search ........ 297/341, 297/344.1, 216.16, 216.18
See application file for complete search history.

(56) References Cited

U.S. PATENT DOCUMENTS

| | | | | |
|---|---|---|---|---|
| 2,795,265 A | * | 6/1957 | Albrecht ............. | 297/341 X |
| 5,449,218 A | | 9/1995 | Beauvais et al. | |
| 5,553,920 A | * | 9/1996 | Meschkat et al. ...... | 297/344.14 |
| 2005/0109555 A1 | | 5/2005 | Ohtsubo et al. | |

FOREIGN PATENT DOCUMENTS

| | | |
|---|---|---|
| DE | 3506999 | 10/1985 |
| EP | 1 533 190 B1 | 5/2005 |
| EP | 1686002 | 8/2006 |
| FR | 2589342 | 5/1987 |
| JP | 62-116324 | 5/1987 |
| JP | 2005-145405 | 6/2005 |
| JP | 2005-162074 | 6/2005 |

* cited by examiner

*Primary Examiner*—Anthony D Barfield
(74) *Attorney, Agent, or Firm*—Studebaker & Brackett PC; Donald R. Studebaker

(57) ABSTRACT

A driving posture adjusting device comprises a slide rail (39) disposed in a forwardly raising posture on a floor portion of a vehicle body; a seat slider (44) disposed in a lower front portion of a seat cushion (35) of a driver seat and slidably supported along the slide rail (39); a seat driving mechanism (40) for moving the driver seat in forward and backward directions by driving the seat slider (44); a guide plate (51) formed with a guide groove (53) of a predetermined path and fixed on the vehicle body; and a guide member (52) provided in a rear portion of the seat cushion (35), the guide member including a guided portion (52) supported along the guide groove (53), where a rear end portion of the seat cushion is raised by sliding the guided portion along the guide groove of the guide plate in response to an operation of moving the driver seat toward a front side of the vehicle body by driving the seat slider by the seat driving mechanism.

7 Claims, 13 Drawing Sheets

FIG.11
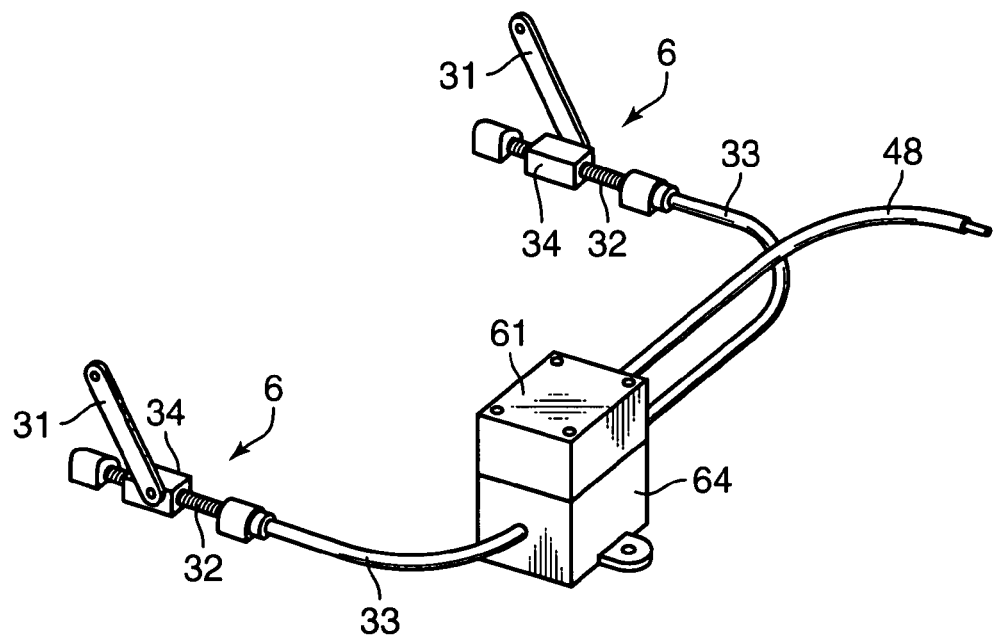
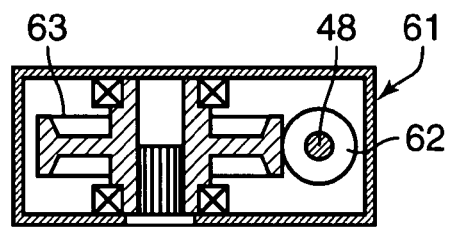
FIG.12A
FIG.12B
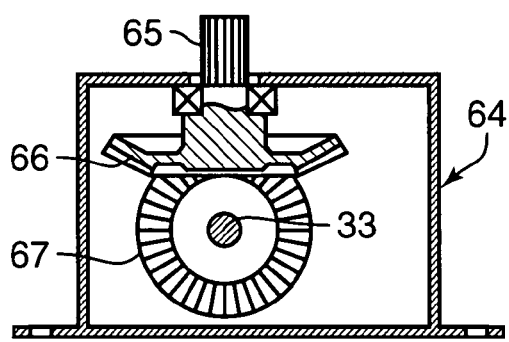

VEHICLE DRIVING POSTURE ADJUSTING DEVICE

BACKGROUND OF THE INVENTION

1. Field of the Invention

The present invention relates to a vehicle driving posture (position) adjusting device adapted for adjusting a position of a driver who sits on a driver seat.

2. Description of the Related Art

As disclosed in Japanese Unexamined Patent Publication No. Sho 62-116324, there has been a conventionally known vehicle seat moving device provided with a pair of front and rear upstanding legs having different heights and borne on a floor panel in a vehicle interior, and slide rails (lower side sliders) adapted for supporting a seat cushion of a driver seat mounted on the upstanding legs slidably in forward and backward directions so that the slide rails are disposed in a front-raised sloping state. This seat moving device has a function of slidably moving the seat cushion of the driver seat in forward and backward directions of a vehicle body along the slide rails, a function of automatically adjusting a vertical position of the driver seat correspondingly to the sloping state of the slide rails, and a function of adjusting a tilting angle of the seat cushion in conjunction with the automatic adjustment of the vertical position of the driver seat.

More specifically, as shown in FIG. 17, the vehicle seat moving device disclosed in Japanese Unexamined Patent Publication No. Sho62-116324 is provided with lever arms 74 each disposed in a lower front portion of a seat cushion 71 and whose central portion is pivotally supported by a lag 73 borne at a front end portion of a slider 72. A front end portion of the lever arm 74 is pivotally supported by a lag 75 fixedly attached on a lower front end surface of the seat cushion 71. A rear end portion of the lever arm 74 is latched slidably along an arc-shaped window 78 formed on a vertical wing 77 of the lower side slider (slide rail) 76 i.e. a guiding groove whose central portion is curved concavely downward.

As the seat cushion 71 is moved forward from a rear position S3 shown with a virtual line to an intermediate position S2 shown with a solid line along the lower side slider 76 disposed in a vehicle body in a front-raised sloping state, the rear end portion of the lever arm 74 latched to the arc-shaped window 78 is guided to be lowered so that the lever arm 74 is shifted to a standing state. Accordingly, the front portion of the seat cushion 71 is pushed upward so that a seat surface is shifted to a front-raised sloping state. Further, as the seat cushion 71 is further moved forward from the intermediate position to the front position shown with a thin line S1, the lever arm 74 is shifted to a reclined state. Accordingly, the front portion of the seat cushion 71 is moved downward, and thereby a slope angle of the seat surface is reduced. Accordingly, the tilting angle of the seat surface becomes the same as that of the rear position S3.

As disclosed in the Japanese Unexamined Patent Publication No. Sho62-116324, the seat cushion 71 is disposed with a tilting means in its front portion. The tilting means includes the arc-shaped windows 78 formed respectively on the vertical wings 77 and the lever arms 74 whose respective rear end portions are slidably latched on the arc-shaped windows 78. The sloping angle of the seat surface is changed by making the seat cushion 71 move about a rear spindle 79 provided as a supporting point in a lower rear end portion of the seat cushion 71 in conjunction with forward and rearward movements of the seat cushion 71. Further, so-called hip points H1 to H3 which are sitting centers of a driver with respect to the seat surface can be vertically moved along an arc-shaped line Ma curved upward.

Thus, when a middle-height person J2 who is shorter than a tall-height person J3 moves forward the seat cushion 71 from the rear position S3 indicated by a virtual line to the intermediate position S2 shown with a solid line along the lower side sliders 76 disposed in the vehicle body in the front-raised sloping state, the middle-height person J2 can be move his hip point H2 upward correspondingly to his seated height by raising a setting height of the seat cushion 71. Accordingly, a view point I2 of the middle-height person J2 is matched with an appropriate line L so that a front vision can be properly secured.

However, when a short-height person J1 who is shorter than the middle-height person J2 moves the seat cushion 71 from the intermediate position S2 shown with a solid line to the front position S1 shown with a thin line along the lower side sliders 76, the sloping angle of the lever arm 74 becomes small so that a front end portion of the seat cushion 71 is lowered. Accordingly, the hip point H1 is moved downward, and a view point I1 of the short-height person J1 who has a short seated height is positioned lower than the appropriate line L. Consequently, it causes a problem that a front vision becomes worse.

On the other hand, when the tall-height person J3 who is taller than the middle-height person J2 retreats the seat cushion 71 from the intermediate position S2 shown with a solid line to the rear position S3 shown with a virtual line along the lower side sliders 76, the tall-height person J3 can move his hip point H3 to be lower than the hip point of the middle-height person J2. Accordingly, on this point, the view point I3 can be lowered to some extent as the seated height of the tall-height person J3 becomes higher. However, as the seat cushion 71 is retreated from the intermediate position B, the sloping angle of the seat cushion 71 in a rear-lowered sloping state becomes smaller. Accordingly, an upper body of the tall-height person J3 is shifted to a substantially upstanding state. Further, corresponding to this operation, a head portion of the tall-height person J3 is moved toward an upper front side so that a view point I3 of the tall-height person J3 is positioned in an upper front side from the appropriate line L. Accordingly, it causes a problem that a field of vision becomes worse. Furthermore, if the hip point H3 of the tall-height person J3 is moved to be lower than that of the middle-height person, and the sloping angle of the seat cushion 71 becomes small, the tall-height person J3 has to sit in a state of making his upper body substantially upstanding and stretching his lower knee toward a front side of the vehicle body in an unnatural angle. Accordingly, it causes a problem that operation of pedals becomes difficult, and driving operability becomes worse.

SUMMARY OF THE INVENTION

In view of the circumstances described above, an object of the present invention is to provide a driving posture adjusting device capable of properly securing a vision of a driver and driving operability in response to an operation of adjusting front and rear positions of a driver seat correspondingly to the physical size of a driver.

In order to achieve the aforementioned object, a driving posture adjusting device, according to the invention, comprises: a slide rail disposed in a forwardly raising posture on a floor portion of a vehicle body; a seat slider disposed in a lower front portion of a seat cushion of a driver seat and slidably supported along the slide rail; a seat driving mechanism for moving the driver seat in forward and backward directions by driving the seat slider; a guide plate formed with a guide groove of a predetermined path and fixed on the vehicle body; and a guide member provided in a rear portion of the seat cushion, the guide member including a guided portion supported along the guide groove. In addition, a rear end portion of the seat cushion is raised by sliding the guided portion along the guide groove of the guide plate in response to an operation of moving the driver seat toward a front side of the vehicle body by driving the seat slider by the seat driving mechanism.

Accordingly, a rear end portion of the seat cushion is raised by sliding the guided portion along the guide groove of the guide plate in response to an operation of moving the driving seat toward a front side of the vehicle body by driving the seat slider by the seat driving mechanism. Thus, a vision of a driver and driving operability can be properly secured in response to an operation of adjusting front and rear positions of the seat correspondingly to the physical size of a driver.

These and other objects, features and advantages of the present invention will become more apparent upon reading of the following detailed description along with the accompanied drawings.

BRIEF DESCRIPTION OF DRAWINGS

FIG. 11 is a perspective view showing a specific configuration of a drive force transmission mechanism.

FIGS. 12A-12B are sectional view showing a specific configuration of the drive force transmission mechanism.

DETAILED DESCRIPTION OF THE PREFERRED EMBODIMENTS OF THE INVENTION

Figure 1:
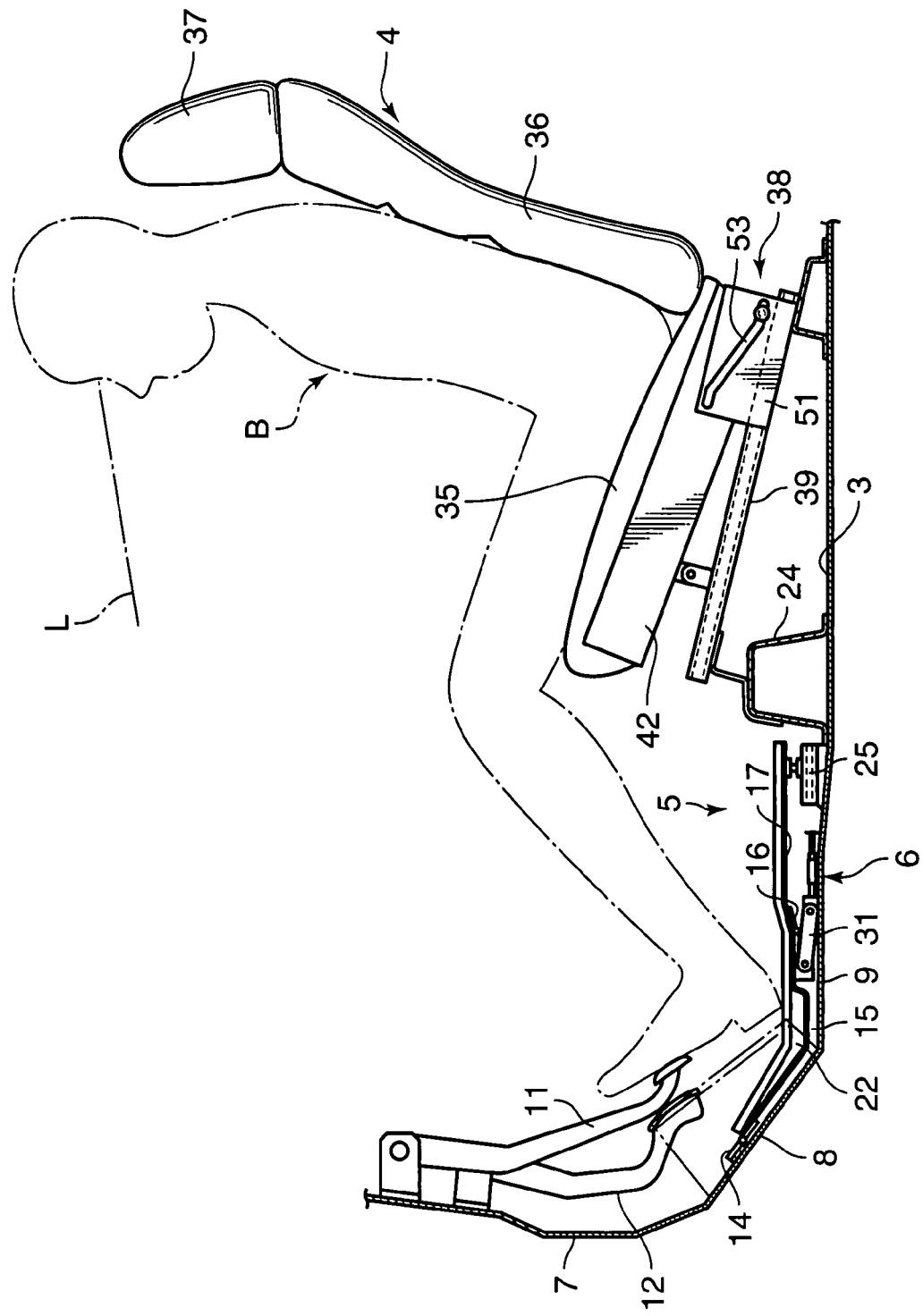
FIG. 1 is a view showing a driving posture (position) adjusting device embodying the present invention.
Figure 2:
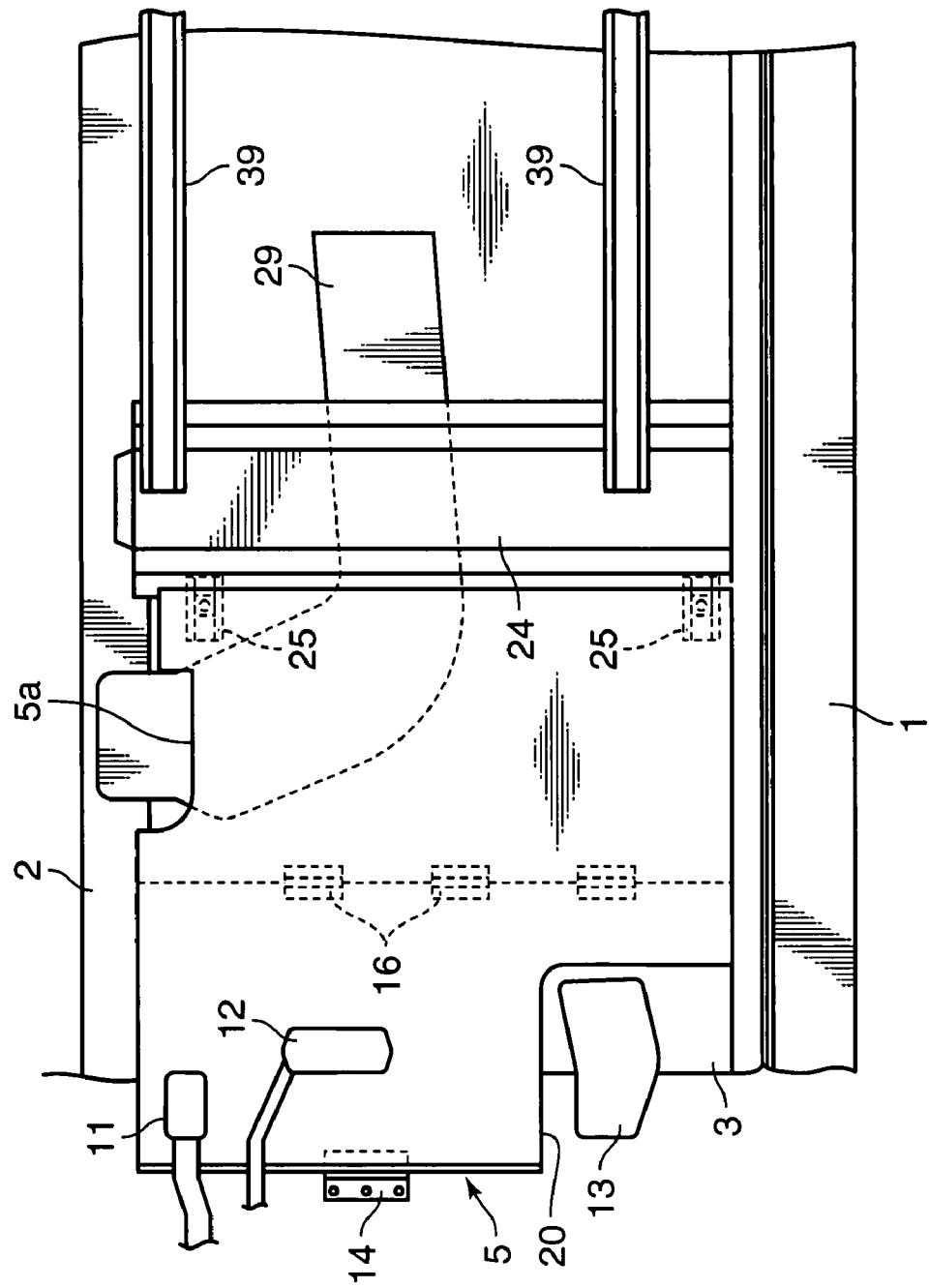
FIG. 2 is a plan view showing a configuration of relevant portions of a movable floor device.
Figure 3:
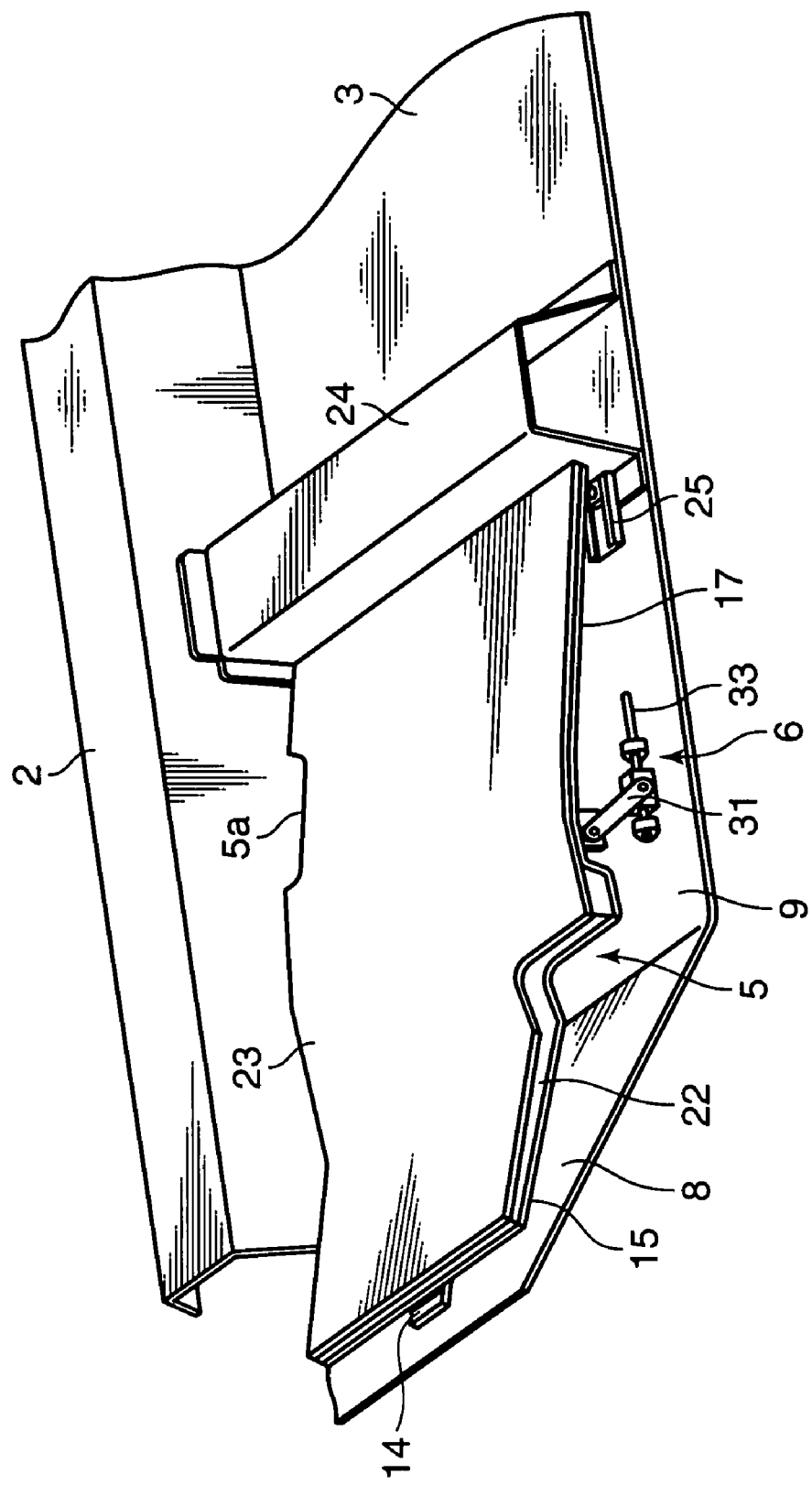
FIG. 3 is a perspective view showing a configuration of relevant portions the movable floor device.

FIGS. 1 to 3 show a driving posture (position) adjusting device embodying the present invention. The driving posture adjusting device is provided in a vehicle body provided with side sills 1 disposed extendingly in forward and rearward directions at left and right side edge portions of a vehicle, a floor tunnel 2 disposed extendingly in forward and rearward directions at a widthwise central portion of the vehicle body, and a vehicle body floor 3 disposed between the floor tunnel 2 and the side sill 1. The driving posture adjusting device includes a seat 4 constructed by a driver seat or the like, a floor board 5 which covers an upper surface of the vehicle body floor 3 positioned in proximity to feet portion of a driver seated on the seat 4, and a raising and lowering mechanism 6 for raising and lowering the floor board 5 with respect to the vehicle body floor 3.

The vehicle body floor 3 has a toe board portion 8 extending from a lower end portion of a dash panel 7 toward a rear side of the vehicle body in a rear-lowered sloping state, and a substantially flat floor bottom portion 9 continuously extending from a rear end of the toe board 8 toward the rear side of the vehicle body. On an upper surface of the vehicle body floor 3, a conventionally known floor trimming member (unillustrated) is disposed with the floor trimming member includes an insulator such as a felt member or a glass wool having sound-insulating and heat-insulating functions, and a surface layer member such as a carpet material which covers the upper surface of the insulator. Further, on the upper side of the toe board portion 8, there are disposed foot pedals including an accelerator pedal 11, a brake pedal 12 and the like which are operated by a driver. On one side portion of the toe board portion 8, there is disposed a foot rest 13.

Figure 4:
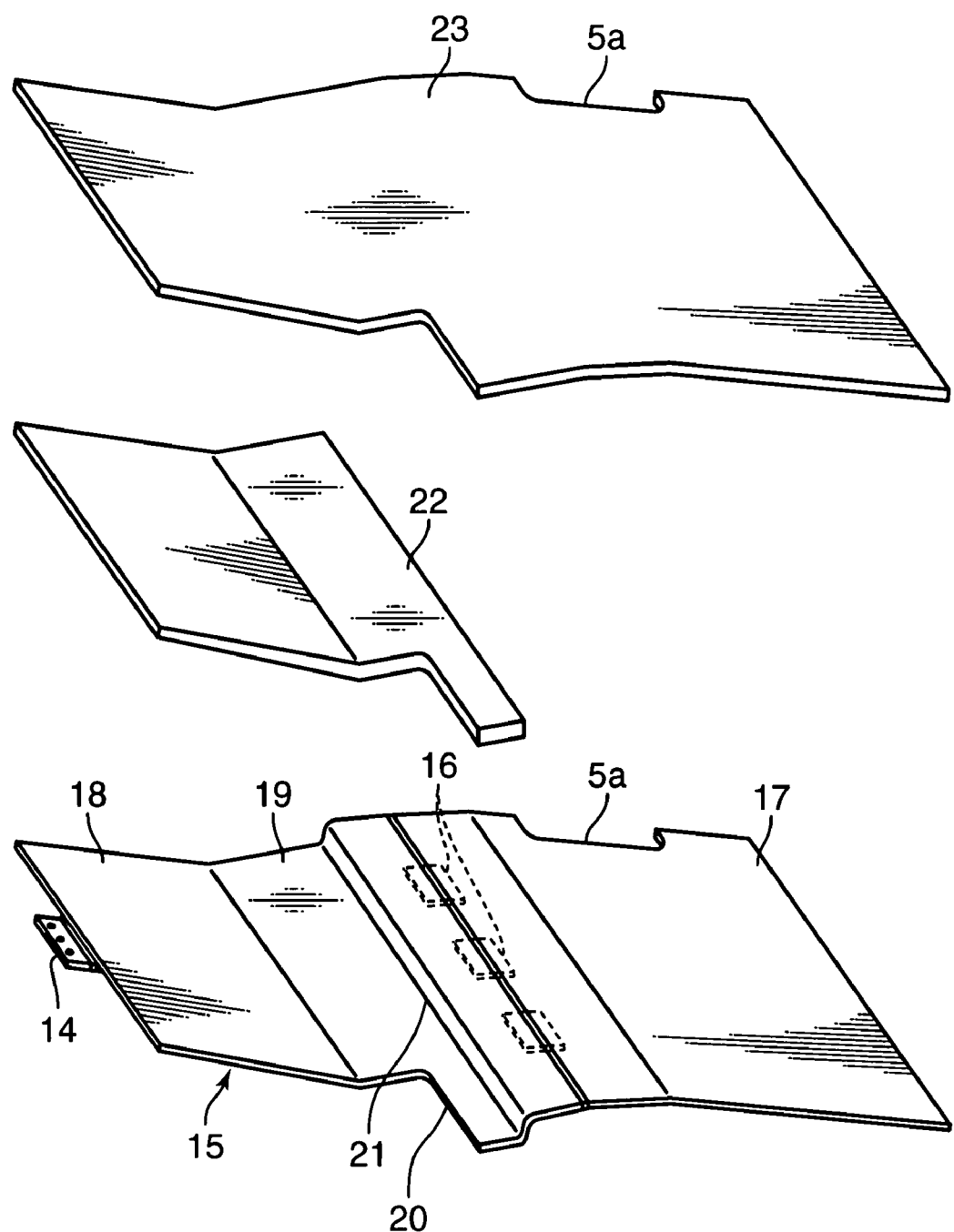
FIG. 4 is an exploded perspective view showing a specific configuration of a floor board.
Figure 5:
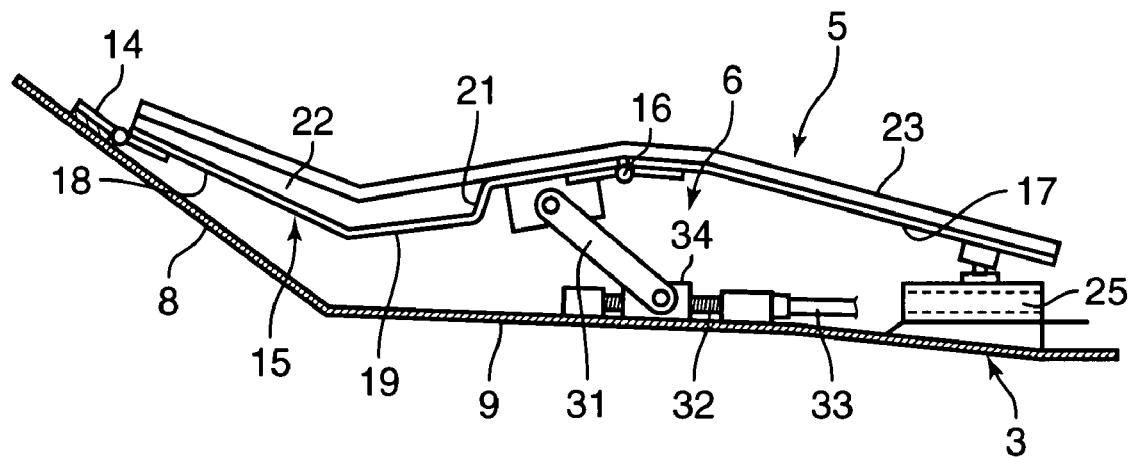
FIG. 5 is a diagram showing a configuration of relevant portions of the movable floor device.

As shown in FIGS. 4 and 5, the floor board 5 includes a front side board 15 whose front end portion is pivotally supported on the toe board portion 8 of the vehicle body floor 3 by a hinge member 14, and a rear side board 17 which is bendably connected to a rear end portion of the front side board 15 via a hinge member 16. The front side board 15 includes a toe board corresponding portion 18 whose front side sloping upward like the toe board portion 8 of the vehicle body floor 3, and a floor bottom corresponding portion 19 extending continuously from a rear end portion of the toe board corresponding portion 18 toward the rear side of the vehicle body. These form the front side board 15 to have a substantially V-shape in a side view. The front portion of the front side board 15, in other words the toe board corresponding portion 18 is disposed extendingly under the foot pedals including the accelerator pedal 11, the brake pedal 12 and the like. Further, in one side portion of the front side board 15, there is an avoiding portion 20 formed by notching out the toe board corresponding portion 18 so as to avoid interference with the foot rest 13.

Further, the front side board 15 is formed with a recessed portion 21 being recessed downward at a portion except for the rear edge portion of the front side board 15. In the recessed portion 21, a shock absorbing member 22 made of a urethane foam material or an elastic body such as a synthetic rubber material is disposed and adhered to thereby cover an upper surface of the floor board 5 in an area including the toe board corresponding portion 18 and floor bottom corresponding portion 19 of the front side board 15. A widthwise size of the shock absorbing member 22 is set to be substantially the same as that of the floor board 5 so that the shock absorbing member 22 is disposed on the floor board 5 in a substantially whole area in widthwise directions of the vehicle. Further, thickness of the shock absorbing member 22 is set so as to be substantially the same as an amount of recession of the recessed portion 21. Accordingly, the respective heights of an upper surface portion of the shock absorbing member 22 and an upper surface of the floor board 5 continuing from the recessed portion 21, more specifically the rear edge portion of the front side board 15 are set to have substantially the same height.

On the upper surface of the floor board 5, one sheet of a surface layer mat member such as a pile material or a backing material is disposed. The surface layer mat member 23 is formed to have such a size continuously covering the upper surface of the shock absorbing material 22 disposed in the recessed portion 21 and the upper surface of the floor board 5 continuing from the upper surface of the shock absorbing material 22. In other words, the surface layer mat member 23 continuously covers the rear portion of the toe board corresponding portion 18 and the rear side board 17. In the side edge portions of the floor board 5 and the surface layer mat member 23, a notch 5a for avoiding interference with a rear heat duct 29 described hereinafter is formed.

The rear side board 17 of the floor board 5 is disposed at a position corresponding to the floor bottom portion 9 of the vehicle floor 3, and its widthwise size is set so as to cover a substantially whole area between the side sill 1 and the floor tunnel 2. Further, on the rear side from a portion where the floor board 5 is disposed, there is disposed the seat 4 constructed by a driving seat. In a lower front end portion of the seat 4, there is disposed a cross member 24 which connects the floor tunnel 2 and the side sill 1. On a front side of the cross member 24, there are provided a pair of left and right guide rails 25 for slidably supporting the rear portion of the rear side board 17.

Figure 6:
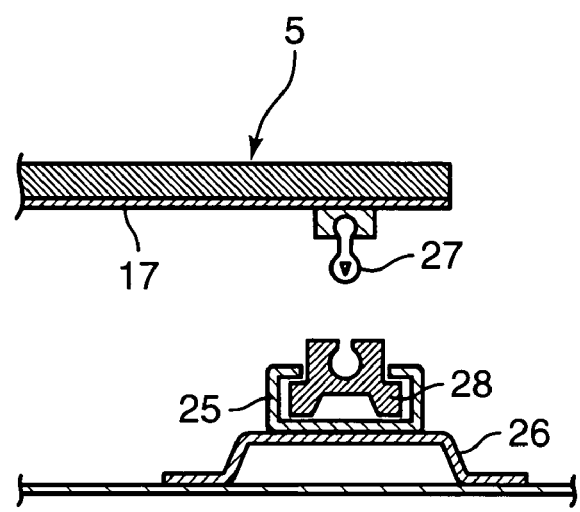
FIG. 6 is a front sectional view showing a supporting structure of a rear edge portion of the floor board.

As shown in FIGS. 5 and 6, each guide rail 25 is constructed by a body having a substantially U-shape cross section attached on the vehicle body floor 3 via a bracket and is so constructed as to hold a slider 28 to which a grommet 27 projecting from a lower rear surface of the rear board 17 is detachably latched. Correspondingly to the raising and lowering movements described hereinafter of the floor board 5, the slider 28 slides along the guide rail 25 so that the rear portion of the rear side board 17 moves forward and rearward while being supported by the guide rail 25.

Figure 7:
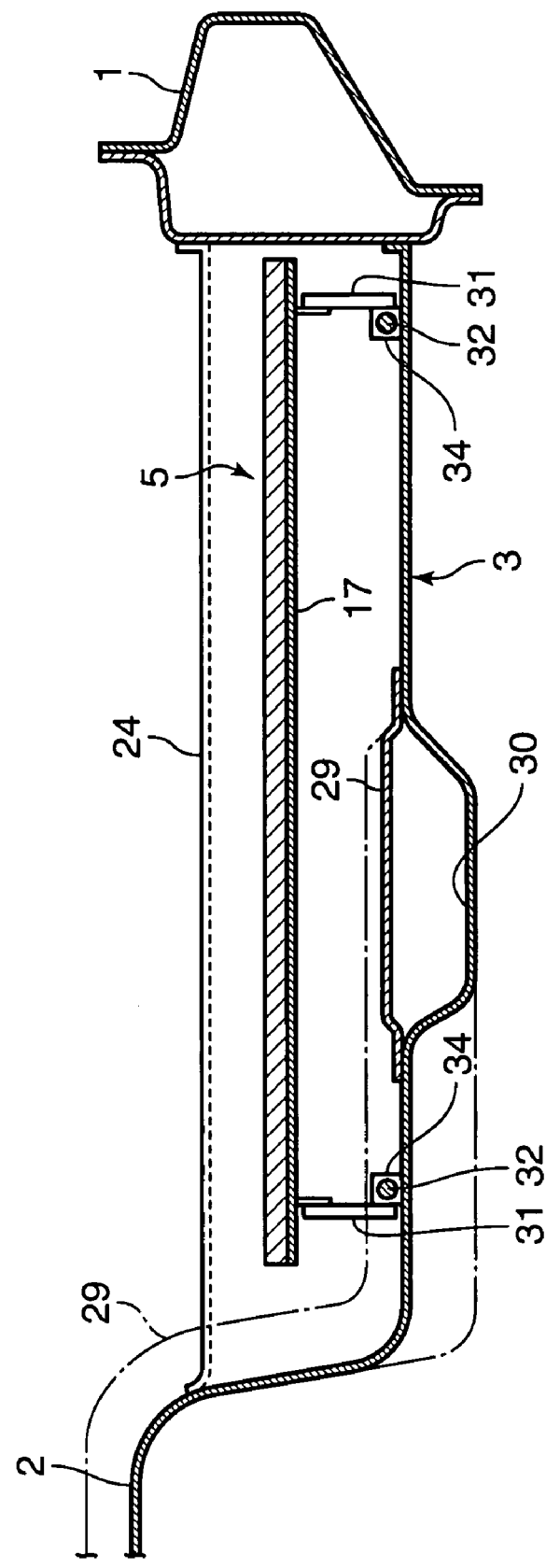
FIG. 7 is a front sectional view showing a structure of a setting portion of a rear heat duct.

Further, as shown in FIGS. 2 and 7, on the vehicle body floor 3, there is disposed the rear heat duct 29 passing under the rear side board 17 from the side portion of the floor tunnel 2 and extending toward the back side of the vehicle body is disposed. The rear heat duct 29 is disposed so that it guides heating air led out from a heater unit (unillustrated) disposed inside an instrument panel from the upper surface of the floor tunnel 2 to a lower side of the rear side board 17 along a side surface of the floor tunnel 2. Thereafter, the air is guided to a rear side of the vehicle body. Further, in the vehicle body floor 3, there is formed a recessed groove portion 30 passing under the cross member 24 and extending toward the rear side of the vehicle body. The recessed groove portion 30 and the rear heat duct 29 form a leading passage for the heating air.

As shown in FIGS. 5 and 7, the raising and lowering mechanism 6 of the floor board 5 includes a pair of left and right driving links 31 whose leading ends pivotally supported on a lower rear surface of the front side board 15, a pair of left and right screw shafts 32 whose front and rear ends are rotatably supported on the upper surface of the vehicle body floor 3 via bearing members, a pair of driving cables 33 which rotationally drive the screw shafts 32, and slide blocks screwedly mounted on the screw shafts 32 respectively and supported slidably along the upper surface of the vehicle body floor 3. A base end portion of each driving link 31 is pivotally supported on a side surface of each slide block 34. The raising and lowering mechanism 6 including the driving links 31 and the screw shafts 32, driving cables 33 and slide blocks 34 for moving the base ends of the driving links 31 forward and rearward is disposed under the floor board 5 positioned on the rear side of the recessed portion 21 formed in the front side board 15. More particularly, the raising and lowering mechanism 6 is disposed under the rear side edge portion of the front side board 15 and the rear side board 17.

The driving cable 33 is a cable member capable of transmitting a rotational force and rotationally held in a flexible cylindrical body. The driving cable is so constructed as to transmit to the screw shafts 32 the rotational force inputted from the seat position adjusting device 38. When the screw shaft 32 is driven in a forward direction in response to the rotational force, the slide blocks 34 is screwedly conveyed toward the front side of the vehicle body along the screw shaft 32. Accordingly, the respective rear end portion of the driving link 31 is pushed forward, and the front end portion of the driving link 31 is pushed upward correspondingly. Consequently, the driving link 31 is shifted from a reclined state to a standing state, and the rear edge portion of the front side board 15 is pushed upward via the driving link 31. Accordingly, the front side board 15 is moved from a lowered position shown in FIG. 1 to a raised position shown in FIG. 5.

On the other hand, the front edge portion of the rear side board 17 of the floor board 5 is connected to the rear end portion of the front side board 15 via the hinge member 16. Accordingly, the front edge portion of the back side board 17 is pushed upward correspondingly to a raising operation of the front side board 15. Further, the rear edge portion of the front side board 15 is moved toward the front side of the vehicle body while being supported on the vehicle body floor 3 by the guide rails 25. Accordingly, the portion connecting the front side board 15 and the rear side board 17 is raised so that the floor board 5 is shifted to a state of being bended upward in a side view.

Further, when the driving cable 33 drives the screw shaft 32 in a reverse direction, and the slide block 34 is moved toward the rear side of the vehicle body along the screw shaft 32, the driving link 31 is shifted from the standing state to the reclined state. Accordingly, the rear edge portion of the front side board 15 is moved from the raised position shown in FIG. 5 to the lowered position shown in FIG. 1. Further, the rear side board 17 is shifted to the lowered position along the vehicle body floor 3.

The seat 4 is a separate-type seat which is individually provided on each of a driver seat side and a passenger seat side in a front portion of a vehicle interior. The seat 4 is provided with a seat cushion 35 constituting a sitting surface for a driver, a seat back 36 standing upward from a rear end portion of the seat cushion 35, and a head rest 37 mounted on an upper end portion of the seat back 36. A seat position adjusting device 38 provided on the vehicle body 3 supports the seat 4 so that front and rear positions, upper and lower positions and a setting angle of the seat cushion 35 with respect to the vehicle body floor 3 can adjusted.

Figure 8:
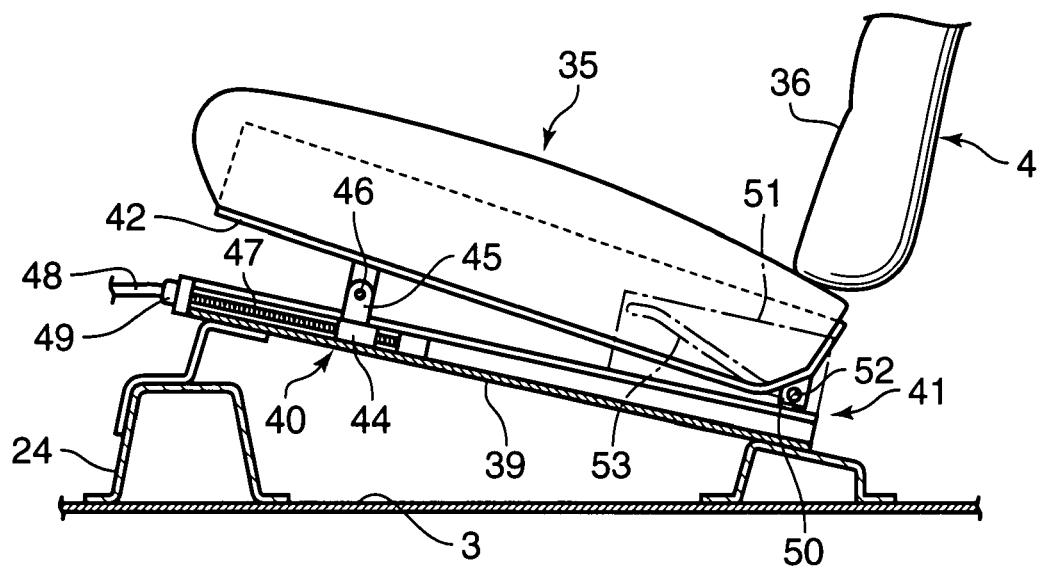
FIG. 8 is a side sectional view showing a structure of a seat position adjusting device.
Figure 9:
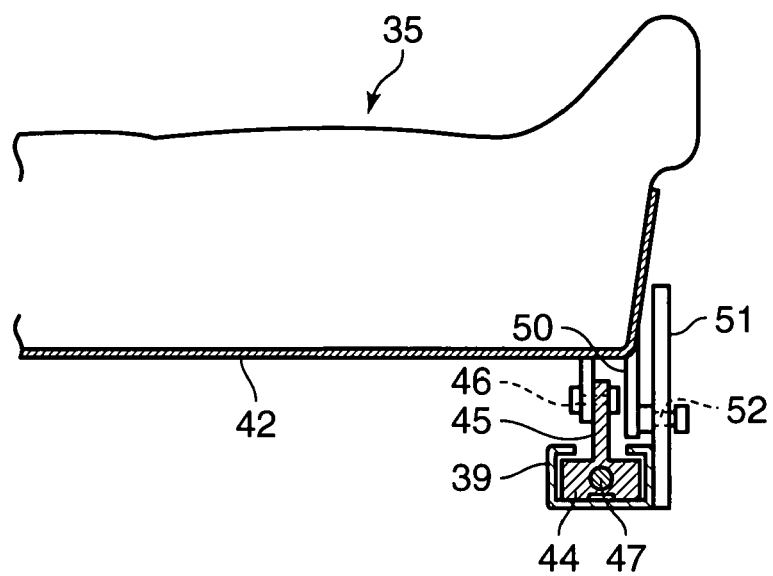
FIG. 9 is a front sectional view showing a structure of the seat position adjusting device.

As shown in FIGS. 8 and 9, the seat position adjusting device 38 includes a pair of left and right slide rails 39 disposed on the vehicle body floor 3 in a front-raised sloping state, a seat driving mechanism 40 for slidably moving the seat cushion 35 in forward and backward directions of the vehicle body along the slide rails 39 and a tilting mechanism 41 for raising and lowering the rear end portion of the seat cushion 35 in conjunction with the forward and backward movements of the seat cushion 35.

The seat cushion 35 includes a cushion frame 42 disposed so as to cover a main body (cushion material) of the seat cushion 35 from the lower side. There are provided in a lower side of the cushion frame 42 the slide rails 39 each constructed by a member having a U-shape section with an open upper surface. In each slide rail 39, a seat slider 44 projectingly provided with a projection 45 on its upper surface is slidably disposed. Further, an upper end portion of the projection 45 is pivotally supported on a lower front surface of the cushion frame 42 via a connecting pin 46. Further, the seat slider 44 is formed with a screw hole into which a screw shaft 47 of the seat driving mechanism 40 is screwed.

The screw shaft 47 of the seat driving mechanism 40 is provided in the slide rail 39. The front and rear ends of the screw shaft 47 is rotatably supported by bearing members. Further, the rear end portion of the screw shaft 47 is connected to a driving motor via an unillustrated power transmission cable. The driving force is transmitted from the driving motor to the screw shaft 47 via the power transmission cable so that the screw shaft 47 is rotationally driven. Accordingly, the seat slider 44 is screwedly conveyed along the slide rail 39. A driving cable 48 adapted for transmitting the drive force to the raising and lowering mechanism 6 of the floor board 5 is connected To the front end portion of the screw shaft 47 via a coupling 49.

The tilting mechanism 41 of the seat position adjusting device 3 includes supporting plates 50 projectingly provided on a lower rear portion of the cushion frame 42, guide plates 51 whose respective lower end portions are fixedly attached on side surfaces of the slide rails 39 and standingly provided in a vertical direction and guide pins (guide members) 52 each projectingly provided on the supporting plate 50. The guide plate 51 is formed with a guide groove 53 having a slope which slopes in a front-raised manner. The guide pin 52 is slidably supported along a bottom wall portion of the guide groove 53. (In the present embodiment, a portion of an outer surface of the guide pin 52 supported by the guide groove 53 constitutes an example of a supported portion.) The seat slider 44 is screwedly conveyed by the screw shaft 47 of the seat driving mechanism 40, and a front portion of the seat cushion 35 moves forward and rearward along the slide rail 39. In response to this, the guide pin 52 slides along the guide groove 53 of the guide plate 51. Accordingly, a rear portion of the seat cushion 35 is raised or lowered about the connecting pin 46 as a supporting point.

Figure 10:
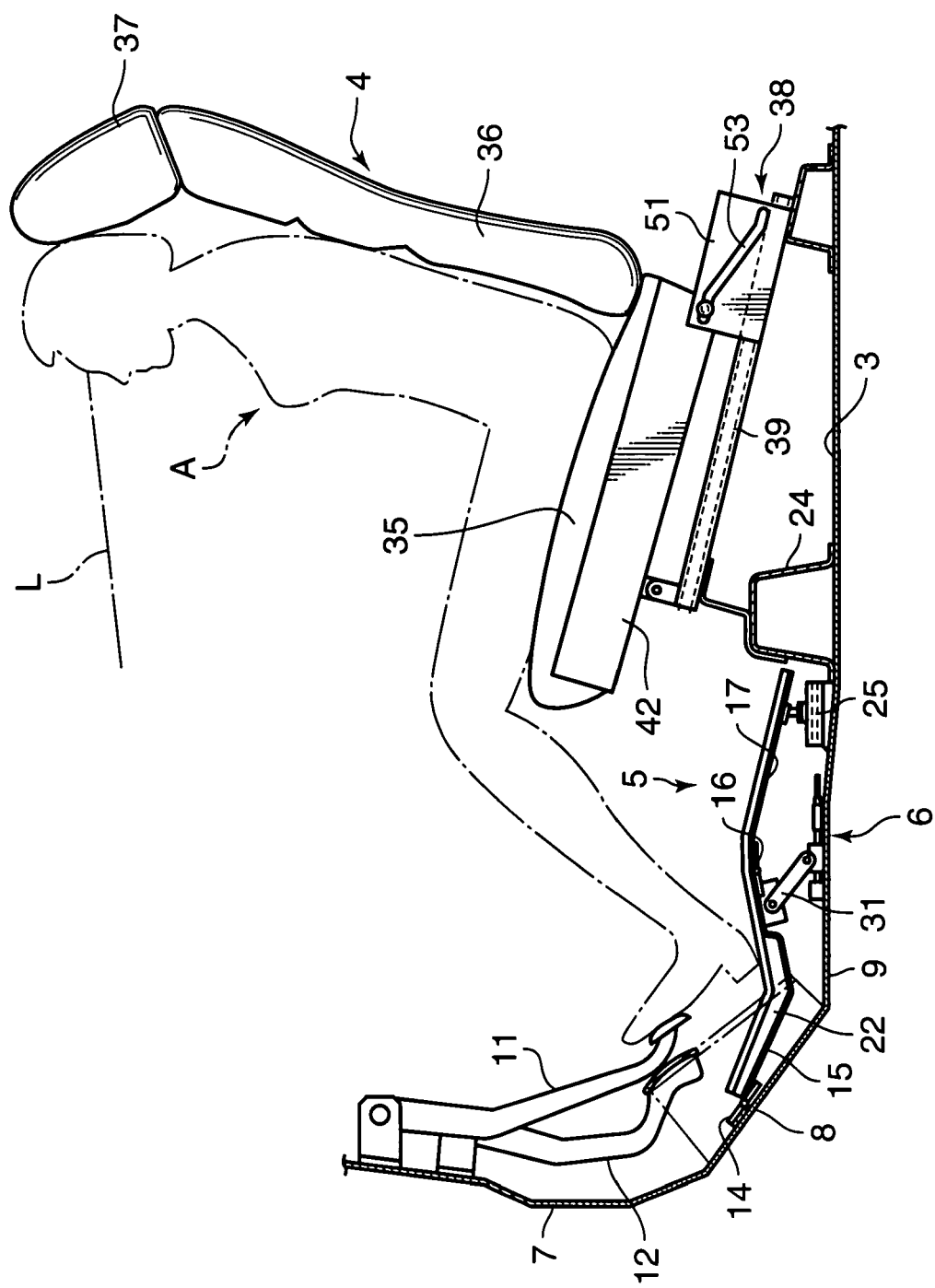
FIG. 10 is a side view showing a state where the driver seat is moved forward.

When the seat cushion 35 is slidably moved by the seat driving mechanism 40 from a rear position shown in FIGS. 1 and 8 to a front position shown in FIG. 10, the seat cushion 35 slidably moves along the slide rails 39 and is gradually raised. Further, the guide pin 52 slides toward the front side of the vehicle body along the guide groove 53 of the guide plate 51. Accordingly, the rear end portion of the seat cushion 35 is pushed upward so that the seat cushion 35 is slidably moved about the connecting pin 46 provided in the front portion as a supporting point. Consequently, as the seat cushion 35 is moved forward, the slope angle with respect to a flat surface becomes gradually small so that the seat cushion 35 is shifted to a nearly flat setting state. Corresponding to this, the seat back 36 is shifted from a backwardly tilted state to a state of being nearly flat.

When a short-height driver A sits on the seat 4, and the seat 4 is slidably moved toward the front side of the vehicle body by operating an unillustrated operation switch to make the driving motor of the seat driving mechanism 40 be operated, the seat cushion 35 is raised along the slide rails 39 as shown in FIG. 10 and slidably moved so that its rear portion is pushed upward. Therefore, a hip point indicating a sitting center of the driver with respect to the seat cushion 35 is moved in an upper forward direction correspondingly to a height of the driver A. Accordingly, the view line of the driver A matches with the appropriate line L. Further, the rear end portion of the seat cushion 35 is pushed upward as the seat 4 is moved forward so that the setting angle is shifted to a nearly flat state. Accordingly, the short-height person A who is likely to have short legs correspondingly to his height bends his knees widely and sits in a posture of pending his lower knee portion in a certain angle. Consequently, it can be prevented that toes are spaced apart from the floor surface.

On the other hand, if the tall-height person B slidably moves the seat 4 by operating the seat driving mechanism 40 toward the rear side of the vehicle body when he sits on the seat 4, the seat cushion 35 is lowered along the slide rails 39 as shown in FIG. 1. Further, the seat cushion 35 is moved about the connecting pin 46 as a supporting point so that a rear portion of the seat cushion 35 is pushed downward. Accordingly, a hip point indicating a sitting center of the driver B with respect to the seat cushion 35 moves toward the lower rear portion correspondingly to the height of the driver B. Accordingly, the view line of the driver B matches with the appropriate line L. Further, the seat cushion 35 is shifted to a front-raised sloping state as the seat 4 is moved backward so that the tall height person B who is likely to have long legs correspondingly to his height makes a bending angle of knees small and stretches his lower knee portions forward. Accordingly, a stable sitting position can be achieved.

The driving cable 48 adapted for transmitting the driving force from the seat driving mechanism 40 to the raising and lowering mechanism 6 of the floor board 5 is a cable rotatably supported by a flexible cylindrical body. As shown in FIG. 11, the leading end portion of the driving cable 48 is led into a first transmission box 61. As shown in FIGS. 12A-12B, the first transmission box 61 is provided with a worm gear 62 coupled with a leading end portion of the driving cable 48 and integrally rotated therewith, and a worm wheel 63 rotationally driven by the worm gear 62. The worm wheel 63 is formed with an engagement hole into which a spline shaft 65 projecting from a second transmission box 64 in a lower side is inserted and engaged. The rotational force of the driving cable 48 is transmitted to the worm wheel 63 via the worm gear 62 so that the worm wheel 63 is rotationally driven. Further, the rotational force is transmitted to the second transmission box 64 via the spline shaft 65.

The second transmission box 64 is provided with a first bevel gear 66 integrally rotated with the spline shaft 65, and a second bevel gear 67 rotationally driven by the first bevel gear 66. The pair of driving cables 33 are attached to the second bevel gear 67 so as to rotate integrally so that the rotational force of the second bevel gear 67 is transmitted to the driving cables 33 of the raising and lowering mechanism 6. Further, between the driving cable 48 of the seat driving mechanism 40 and the driving cables 33 of the raising and lowering mechanism 6, there are disposed a speed reduction mechanism constructed by the worm gear 62 and the worm wheel 63 so that a rotational speed is reduced to one-tenth when the rotational driving force is transmitted from the driving cable 48 of the seat driving mechanism 40 to the driving cables 33 of the raising and lowering mechanism 6.

The second transmission box 64 is disposed in the front side of the cross member 24 which is disposed in the front side of the seat 4 and fixedly attached to the vehicle body floor 3 with an attachment bolt. Further, the second transmission box 64 is integrally connected to the first transmission box 61 by connecting bolts in a state of being placed thereon. When the first transmission box 61 is placed on then upper side of the second transmission box 64, the spline shaft 65 is inserted into the engagement hole of the worm wheel 6 disposed in the first transmission box 61 so that these are integrally connected.

When the seat slider 44 is screwedly conveyed by the seat driving mechanism 40 to make the seat cushion 35 move in forward and backward direction along the slide rails 39, the driving force is transmitted to the driving cables 33 of the raising and lowering mechanism 6 via the driving cable 48 and the first and second transmission boxes 61, 64. Accordingly, the driving cables 33 and the screw shafts 32 are rotationally driven, and the slide blocks 34 are screwedly conveyed in forward and backward directions. Accordingly, the driving links 31 are shifted from the reclined state to the standing state or from the standing state to the reclined state so that the rear edge portion of the front side board 15 is driven to be raised or lowered.

For example, if the short-height person A makes the seat 4 move toward the front side of the vehicle body when he sits on the seat 4, the driving links 31 are shifted from the reclined state to the standing state in conjunction with the movement so that the rear edge portion of the front side board 15 of the floor board 5 is moved to the raised position shown in FIGS. 5 and 10. On the other hand, if the tall-height person B makes the seat 4 move toward the rear side of the vehicle body when he sits on the seat 4, the driving links 31 are shifted from the standing state to the reclined state in conjunction with the movement, thereby the rear edge portion of the front side board 15 of the floor board 5 is shifted to the lowered position shown in FIG. 1. Accordingly, the setting height of the floor board 5 on which heel portions of the driver are placed is adjusted to a position suitable for the lengths of the legs of the drivers A, B.

As described above, there are provided the slide rail 39 disposed in a state of front-raised slope on a floor portion of the vehicle body, the seat slider 44 disposed in a lower front portion of the seat cushion 35 of the seat 4 and slidably supported along the slide rail 39, the seat driving mechanism for moving the seat 4 in forward and backward directions by driving the seat slider 44, the guide plate 51 having the guide groove 53 of a certain path and fixed on the vehicle body, and the guide pin 52 provided in the rear portion of the seat cushion 35 and supported along the guide groove 53. The rear end portion of the seat cushion 35 is raised by sliding the guide pin 52 along the guide groove 53 of the guide plate 51 in response to an operation of moving the seat 4 toward the front side of the vehicle body by driving the seat slider 44 with the seat driving mechanism 40. Accordingly, there is an advantage that the field of vision of a driver and driving operability can be properly secured correspondingly to the operation of adjusting the front and rear position of the seat 4 correspondingly to the driver body size.

In other words, when the short-height driver A sits on the seat 4, the seat cushion 35 is raised along the slide rails 39 as shown in FIG. 10 by making the seat 4 slidably move toward the front side of the vehicle body with the seat driving mechanism 40. Further, the rear portion of the seat cushion 35 is pressed upward by making the guide pin 52 slidably move along the guide groove 53 of the guide plate 51. Therefore, a hip point indicating a sitting center of the driver A with respect to the seat cushion 35 is moved toward the upper front portion correspondingly to a height of the driver A. Accordingly, a view line of the driver A is matched with the appropriate line L so that a field of view of the driver A can be secured. Further, the rear end portion of the seat cushion 35 is pushed upward as the seat 4 is moved forward so that its disposed angle is shifted to a nearly flat state. Accordingly, the short-height person A who is likely to have short legs depending upon his height sits in a state of bending his knee and pending the lower knee portions. Accordingly, there are advantages that a state of spacing feet apart from the floor surface can be prevented, and operability with respect to the brake pedal 12 and the like can be maintained in a good condition.

On the other hand, when the tall-height driver B sits on the seat 4, the seat 4 is slidably moved toward the rear side of the vehicle body with the seat driving mechanism 40. Accordingly, the seat cushion 35 is lowered along the slide rails 39 as shown in FIG. 1. Further, the guide pin 52 slides along the guide groove 53 of the guide plate 51 so that the rear portion of the seat cushion 35 is moved downward. Accordingly, a hip point of the driver B with respect to the seat cushion 35 is moved to the lower rear portion correspondingly to a height of the driver B so that the view line can be matched with the appropriate line L. Further, the seat cushion 35 is shifted to a state of front-raised slope accordingly to the rearward movement of the seat 4. Accordingly, the tall-height person B who is likely to have long legs correspondingly to his height can sit in a state of stretching his lower knee portions forward so that the tall-height person B does not need to unnaturally bend his long legs. Consequently, there is an advantage that a stable sitting position can be achieved.

Furthermore, as compared to the prior art which is so constructed as to make the sloping angle of the seat cushion 35 be changed by the link mechanism, the way of changing of the sloping angle of the seat cushion 35 which changes correspondingly to forward and rearward movements of the seat 4 can be easily and desirably changed by changing the path of the guide groove 53 formed in the guide plate 51 in various ways. For example, the way of changing of the sloping angle of the seat cushion 35 can be easily changed by forming a guide groove curved in an arc-shape in the guide plate 51 in place of the above-described embodiment where a central portion of the guide groove 53 is sloped with a straight line.

Further, as shown in the above-described embodiment, in the case where it is so constructed that the lower end portion of the guide plate 51 is supported on the slide rails 39 which are fixedly attached to the vehicle body floor 3 via the cross member 24 and the like so that the guide plates 51 is supported on the floor portion of the vehicle body via the slide rails 39, there is an advantage that a load applied to the guide plates 51 from the seat cushion 35 via the guide pin 52 e.g., a weight and the like of a driver who sits on the seat 4 can be stably supported by the slide rails 39. Further, an assembling operation with respect to the vehicle body can be performed in a state where the tilting mechanism 41 having the guide plate 51 and the guide pin 52, and the slide rail 39 are integrally coupled, workability can be improved effectively.

In the embodiment described above, each guide plate 51 is formed by a plate member provided standingly in a vertical direction and having a specified thickness, and the guide groove 53 is formed by an elongated hole perforated on the guide plate 51 so that the guide pin 52 is slidably supported along the bottom wall portion of the guide groove 53. Accordingly, there is an advantage that a load applied from the seat cushion 35 to the guide plates 51 via the guide pins 52 can be stably supported so that occurrence of deformation of the guide plate 51 due to the load can be effectively prevented. Further, by changing a shape of the elongate hole, the way of changing the sloping angle of the seat cushion 35 changing correspondingly to forward and backward movements of the seat 4 can be easily and appropriately changed.

Figure 13:
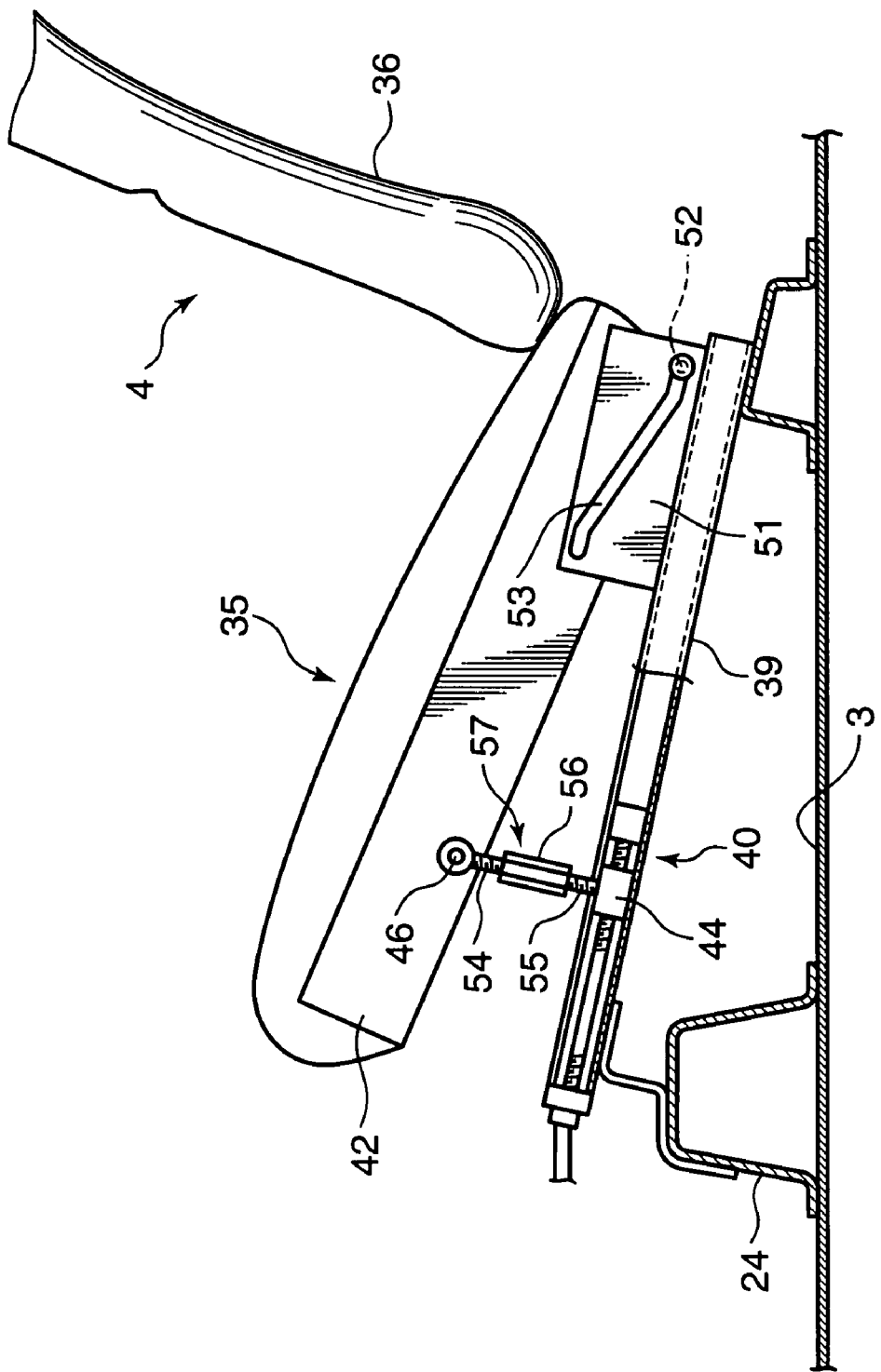
FIG. 13 is a diagram showing another driving posture adjusting device embodying the present invention.

Further, as shown in FIG. 13, it may be so constructed as to provide between a front portion of the seat cushion 35 and the seat slider 44 an adjusting mechanism 57 including a pair of upper and lower screw shafts 54, 55 and a nut member 56 into which leading ends of the respective screw members 54, 55 are screwed, and adjust the distance between the front portion of the seat cushion 35 and the seat slider 44. When the above arrangement is adapted, there is an advantage that a sitting position of a driver can be appropriately adjusted in accordance with the driver's height while preventing the range of forward and backward movements of the driver seat from becoming great.

Figure 14:
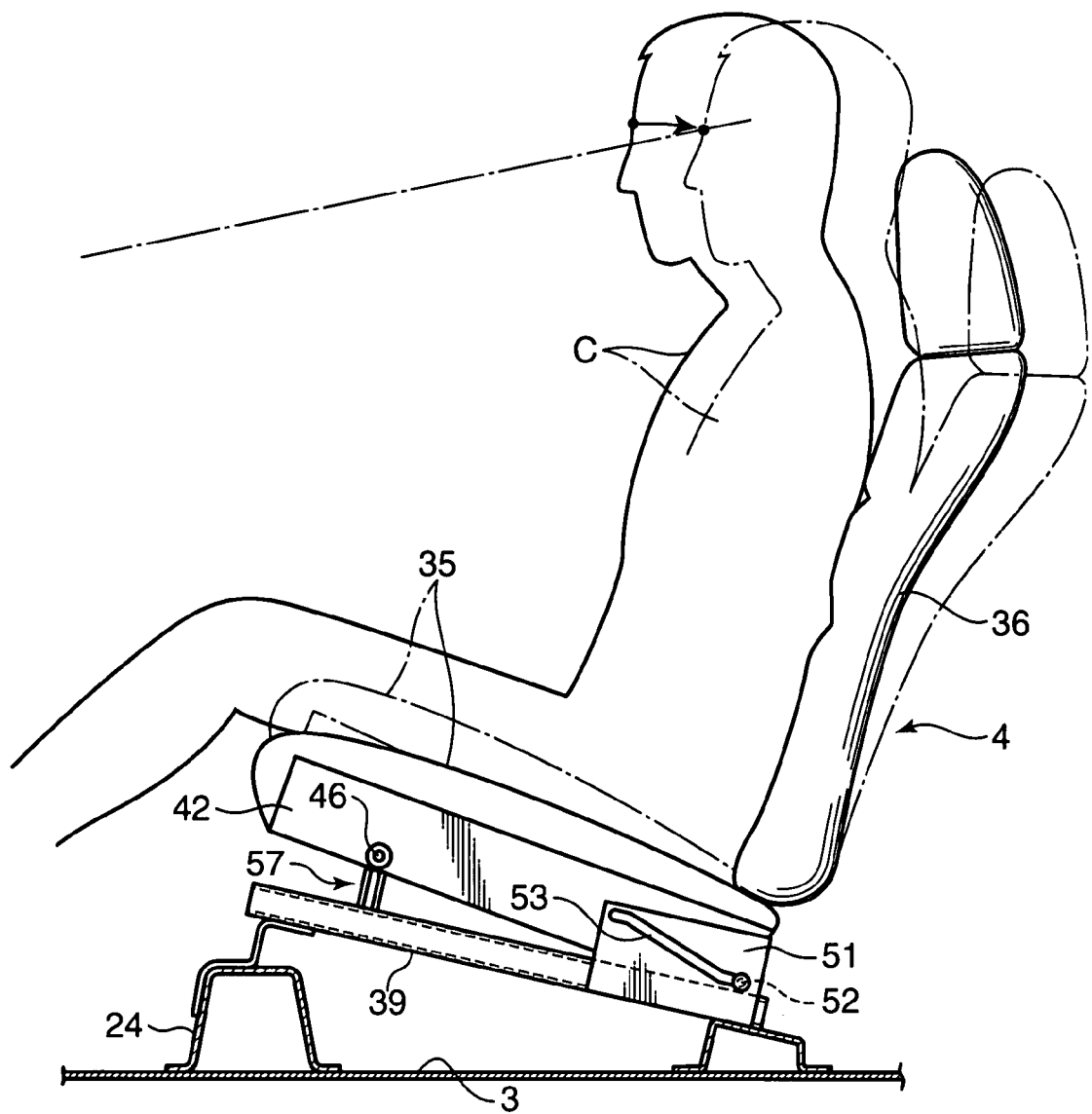
FIG. 14 is a diagram showing an operation of the driving posture adjusting device.

Namely, in a vehicle where there is a likelihood that a driver who is very tall sits on the seat 4, the nut member 56 is rotationally operated to be moved in a direction of spacing the base end portions of the screw shafts 54, 55 apart from each other, in other words, in a direction of moving upward the upper screw shaft 54 whose upper end portion is pivotally supported at a front portion of the seat cushion via the connecting pin 46. Further, the lower screw shaft 55 projectingly provided on an upper surface of the seat slider 44 is driven in a direction of moving downward. Accordingly, as shown in FIG. 14, the seat cushion 35 is displaced from the state indicated by a solid line to a state of rear-lowered slope as indicated by a virtual line by moving the front end portion of the seat cushion 35 upward by slidably moving the guide pin 52 provided in the rear end portion of the seat cushion 35 as a supporting point. By moving the head portion of a very tall driver C sitting on the seat 4 toward the back side of the vehicle body, a view line of the driver C can be matched with the appropriate line L. Further, by making the sloping angle of the seat cushion 35 great, the driver C can sit in a relaxed condition while stretching his lower knee portion forward.

On the other hand, in a vehicle where there is a likelihood that a short-height driver sits on the seat 4, the base end portions of the respective screw shafts 54, 55 are made come close to each other to make the seat cushion being in a rear-lowered slope displaced downward so that the sloping angle is made small. Accordingly, the view line of the driver can be matched with the appropriate line L. Further, by making the sloping angle of the seat cushion be small, a state of spacing feet of the driver from the floor surface can be prevented. Then, in a case where a driver who is further shorter than the driver above sits on the seat 4, the seat cushion 35 is moved toward the front side of the vehicle body along the slide rail 39. Further, the rear end portion of the seat cushion 35 is further raised by making the guide pin 52 slide along the guide groove 53 of the guide plate 51. Accordingly, the view line of the driver can be matched with the appropriate line L.

In the case where the adjusting mechanism 57 for adjusting the distance between a front portion of the seat cushion 35 and the seat slider 44 is provided as described above so that the sloping angle may be changed by moving upward and downward the front end portion of the seat cushion 35 in advance by the adjusting mechanism 57 respectively for a vehicle to be sold abroad such as Europe and the United States where there is a likelihood that the tall-height driver C is likely to sit on the seat or for a vehicle to be sold domestically where there is a likelihood that a very short height driver sits on the seat, there is an advantage that the range of forward and backward movements of the driver seat is prevented from becoming great. Further, there is an advantage that a sitting position can be easily and appropriately adjusted correspondingly to the driver height in any of cases where there is a likelihood that the tall-height driver C sits on the seat 4 or where there is a likelihood that a very small-height driver sits.

Figure 15:
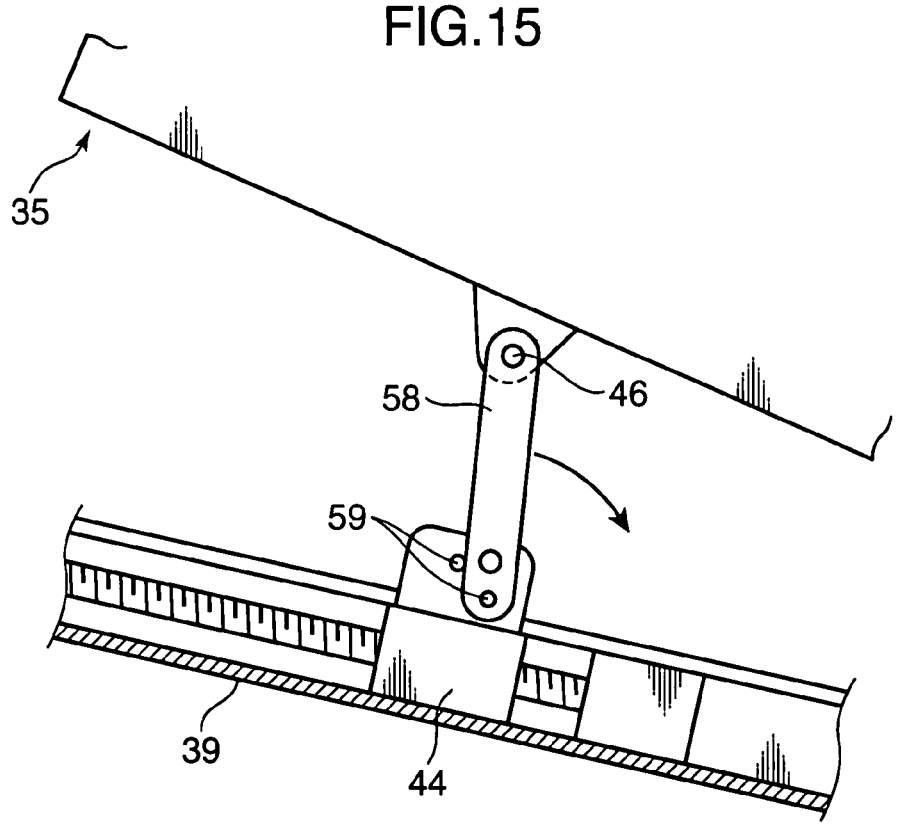
FIG. 15 is a diagram showing yet another driving posture adjusting device embodying the present invention.
Figure 16:
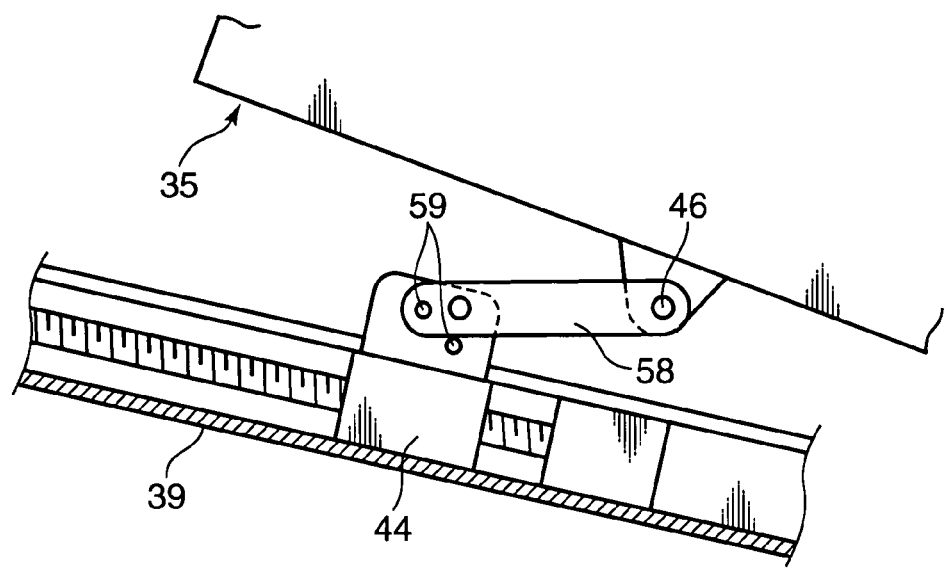
FIG. 16 is a diagram showing an operation of the driving posture adjusting device.
Figure 17:
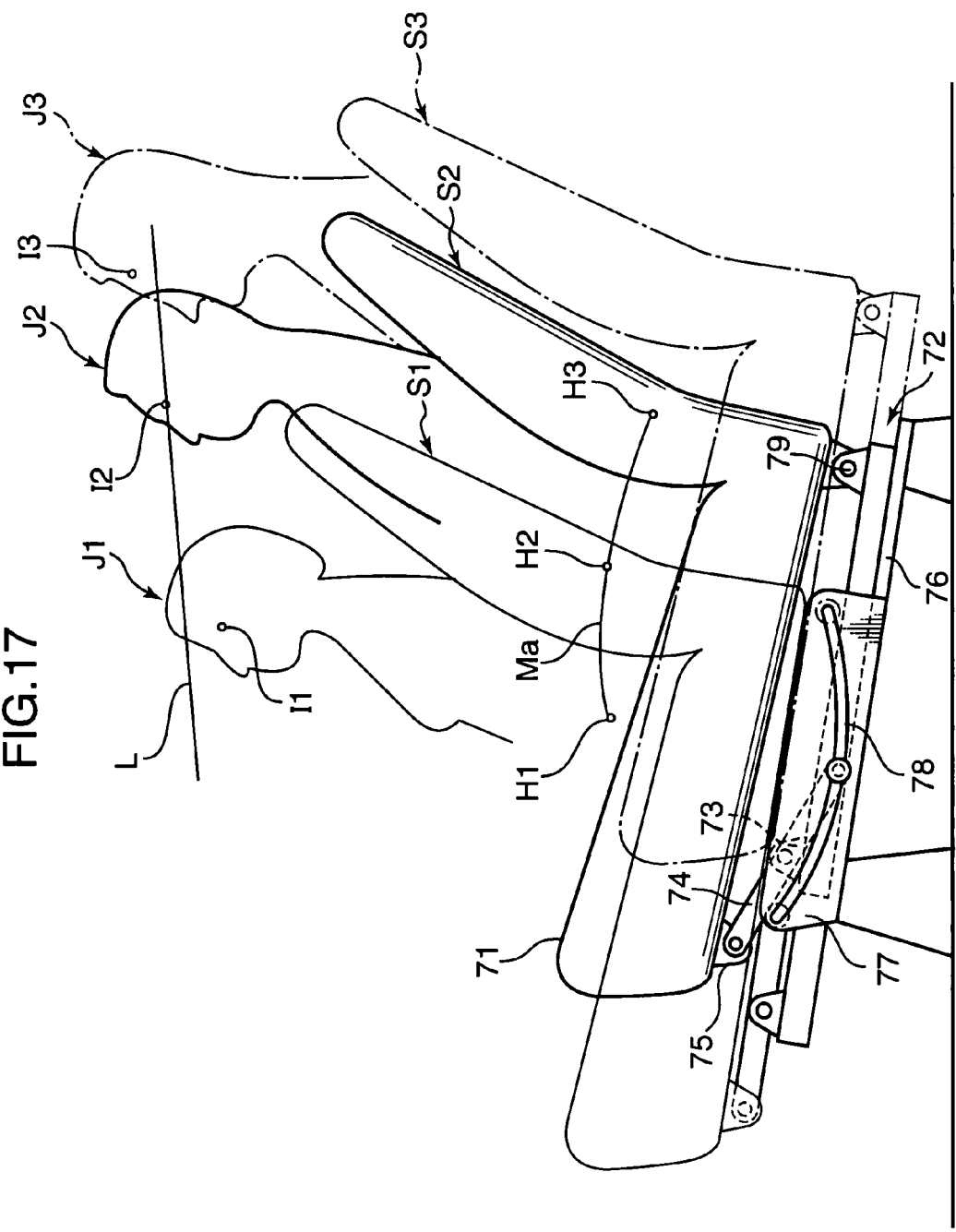
FIG. 17 is a view showing a prior art of the driving posture adjusting device according to the present invention.

Further, as shown in FIGS. 15 and 16, it may be so constructed that a distance between the front portion of the seat cushion 35 and the seat slider 44 is adjusted in a two-step manner by providing an adjusting mechanism having rising links 58 between the front portion of the seat cushion 35 and the seat sliders 44 and making the rising links 58 slidably moved from the standing state shown in FIG. 15 in a direction indicated by an arrow to be shifted to the reclined state shown in FIG. 16. In FIGS. 15 and 16, identified by 59 is an engagement hole to which an unillustrated engagement pin is inserted to hold the rising link 58 in either one of the standing state and the reclined state.

Further, in the above-described embodiment, as shown in FIGS. 1, 3, 5 and the like, in the vehicle provided with the floor board 5 for covering the upper surface of the vehicle body floor 3 at the feet portion of the driver sitting on the driver seat and the raising and lowering mechanism 6 for raising and lowering the floor board 5, the vehicle body floor 3 is provided with the toe board portion 8 in a rear-lowered slope and the floor bottom portion 9 extending toward a backside of the vehicle body continuously from the rear end portion of the toe board portion 8, and the floor board 5 is provided with the toe board corresponding portion 18 corresponding to the toe board portion 8 of the vehicle body floor 3 and the floor bottom corresponding portion 19 corresponding to the floor bottom portion 9. The toe board corresponding portion 18 and the floor bottom corresponding portion 19 of the floor board 5 is formed to be substantially V-shape in a side view. Accordingly, there is an advantage that the floor board 5 positioned at a feet portion of the driver sitting on the driver seat can be raised or lowered appropriately.

Namely, by forming the toe board corresponding portion 18 and the floor bottom corresponding portion 19 of the floor board to be V-shape in side view, the floor board 5 is so constructed as to correspond to the vehicle body floor 3 positioned at feet of a driver sitting on the driver seat i.e. the toe board portion 8 in a rear-lowered slope and the floor bottom portion 9 continuously extending from the rear end portion of the toe board portion 8 toward the back side of the vehicle body. Accordingly, by setting the toe board corresponding portion 18 and the floor bottom corresponding portion 19 to be along the toe board portion 8 and the floor bottom portion 9 of the vehicle body floor 3 in a case where the floor board 5 is lowered correspondingly to a driver body, a formation of a space between the floor board 5 and the vehicle body floor 3 can be prevented even in the case where a disposing area of the floor board 5 in forward and backward directions of the vehicle body is set to be large. Thus, there are advantages that the floor board 5 can be raised and lowered by the raising and lowering mechanism 6 correspondingly to the body size of a driver while reserving enough moving area of feet placed on the floor board 5 and that sufficient lowering range of the floor board 5 can be reserved without positioning the vehicle body floor 3 in an unnecessarily lower side by preventing the formation of an excessive space between the floor board 5 and the vehicle body floor 3.

Further, in the above-described embodiment, when the short-height person A sits on the seat 4 in a state of bending his knees widely and pending the lower knee portions at a predetermined angle, the rear edge portion of the front side board 15 is displaced to the raised position as shown in FIGS. 5 and 10 by the raising and lowering mechanism 6 in a state where the front end portion of the toe board corresponding portion 18 constituting the front side board 15 of the floor board 5 is pivotally supported by the toe board portion 8 of the vehicle body floor 3, thereby the floor bottom corresponding portion 19 of the front side board 15 is shifted to a front-lowered sloping state. Accordingly, when the short-height person operates the brake pedal 12 and the like by pressing it forward, its heel portion can be smoothly moved toward the front side of the vehicle body along the toe board corresponding portion 18.

Especially, as shown in the above-described embodiment, in a case where the floor board 5 is provided with the front side board 5 whose front end portion is supported at the vehicle body floor 3 and the rear side board 17 connected bendably to the rear end portion of the front side board 15 via the connecting member constructed by the hinge member 16, and the rear end portion of the rear side board 17 is moved forward and backward along the floor bottom portion 9 of the vehicle body floor 3, a setting height and the like of the floor board 5 can be easily and appropriately displaced in accordance with the driver body size by bringing the floor board 5 in a state of being bent upward in a side view by raising the connecting portion between the front side board 15 and the rear side board 17 by the raising and lowering mechanism 6 for raising and lowering the floor board 5.

Namely, the setting height of the floor board 5 can be adjusted by dividing the floor board 5 to the front side board 15 whose front end portion being supported by the vehicle body floor 3 and the rear side board 17 connected bendably to the rear end portion of the front side board 15 via the connecting member constructed by the hinge member 16 and making the connecting portion of both boards 15, 17 be raised and lowered. Accordingly, the setting height of the floor board 5 can be appropriately adjusted without causing a condition where front end portion or the rear end portion of the floor board is largely moved so that a space with respect to the vehicle body floor 3 does not occur unlike the case where the floor board is integrally moved so as to adjust its setting height by raising and lowering about one end as a supporting point the floor board having a large area. Further, as compared to the case where the setting height is adjusted by integrally raising and lowering the one sheet board of floor board, there is an advantage that the floor board 5 can be easily raised or lowered with a small drive force. Further, changes in longitudinal size of the floor board 5 which is caused when a connecting portion of the front side board 15 and the rear side board 17 is raised or lowered by the raising and lowering mechanism 6 can be absorbed in the lower front portion of the driver seat, namely the rear portion of the rear side board 17 placed in a lower knee portion of the driver. Accordingly, there is an advantage that a provision of uncomfortable feeling due to changes of longitudinal size of the floor board 5 to feet portion of the driver can be prevented.

Further, in the above-described embodiment, the raising and lowering mechanism 6 is provided with driving links 31 whose front end portion is connected to the rear portion of the front bottom corresponding portion 19, and a slide drive portion for uplifting the driving links by moving base end portions of the driving links 31 forward and backward along the vehicle body floor 3 to raise or lower the floor board 5. Particularly, there is provided the screw shafts 32, slide blocks 34 and the like. Accordingly, the rear portion of the floor bottom corresponding portion 19 pivotally supported at a front end portion of the toe board portion 8 of the vehicle body floor 3 is supported by the driving links 31 and raised or lowered with a small force. Further, there is an advantage that load applied to the floor board 5 from heel portions of the driver placed on the floor bottom corresponding portion 19 is supported by the driving links 31, and the floor board 5 can be appropriately raised or lowered.

Further, as shown in the above-described embodiment, in a case where the raising and lowering mechanism 6 is provided with the pair of driving links 31 and the slide drive portion, and the pair of driving cables 33 for respectively transmitting the drive force from a single driving source (a driving motor of the seat adjusting device 38) to the left and right slide driving portion, both left and right edge portions of the floor board 5 can be supported by both the driving links 31. Accordingly, a stable supporting state can be obtained, and the floor board 5 can be easily raised or lowered with a simple configuration.

Especially in the above-described embodiment, the recessed portion 21 being recessed downward is formed in a front portion of the floor board 5. In the recessed portion 21, the shock absorbing member 22 made of a urethane foam material or an elastic body such as a synthetic rubber material is disposed. Further, in the lower portion of the floor board 5 positioned in the rear side of the recessed portion 21 i.e. in the rear edge portion of the front side board 15 and a lower side of the rear side board 17, the raising and lowering mechanism 6 is provided. Accordingly, in a case where a collision of the vehicle occurs in a state where the driver who sits on the seat 4 places his heel portions and the like on the shock absorbing member 22, the shock absorbing member 22 absorbs an impact load applied to the heel portions of the driver from the floor board 5 so that lower body portion of the driver can be protected effectively. Further, the raising and lowering mechanism 6 can be disposed in a compact manner by utilizing a space formed in a lower portion of the floor board 5 positioned in a rear side of the recessed portion 21.

Further, in the above-described embodiment, the recessed portion 21 recessed downward is formed in a front portion of the floor board 5, particularly in the front side board 15, and the shock absorbing member 22 is disposed in the recessed portion 21. Accordingly, also in the case where the shock absorbing member 22 having a specified thickness is provided only in a front portion of the floor board 5, there is an advantage that formation of a large step on the upper surface of the floor board 5 can be prevented, and the upper surface is formed to be flat. Further, in a case where a load which presses the shock absorbing member 22 rearward is applied at the time of collision, the rear end of the sock absorbing member 22 is made come in contact with the step formed in the rear end portion of the recessed portion 21. Consequently, the backward movement of the shock absorbing member 22 can be prevented so that its attaching state is stabilized.

As shown in the above-described embodiment, in a case where heights of the upper surface portion of the shock absorbing member 22 disposed in the recessed portion 21 and an upper surface of the floor board 5 continuing from the recessed portion 21, particularly, heights of the rear edge portion of the front side board 15 and the rear side board 17 are set to be substantially the same, occurrence of uncomfortable feeling when feet placed on the floor board 5 are moved can be suppressed while reserving enough thickness of the shock absorbing member 22. Further, operability of operating accelerator pedal 11 and the like can be effectively improved.

Further, in the above-described embodiment, the surface layer mat member 23 which continuously covers the upper surface portion of the shock absorbing member 22 disposed in the recessed portion 21 and the upper surface portion of the floor board 5 continuing from the recessed portion 21 (the rear edge portion of the front side board 15 and the rear side board 17). Accordingly, there is an advantage that occurrence of uncomfortable feeling when feet are moved can be further suppressed by effectively making upper end surface of the floor board 5 be flat.

Further, as shown in the above-described embodiment, in the case where the vehicle is provided with the cross member 24 in widthwise directions of the vehicle in the lower front portion of the seat 4, and the rear end portion of the rear side board 17 is extended to a position in proximity to the cross member 24, the rear portion of the rear side board 17 moved forward and rearward correspondingly to raising and lowering of the connecting portion connecting the front side board 15 and the rear side board 17 can be hidden by positioning the rear portion of the rear side board 17 between the front lower surface of the seat cushion 35 and the front wall surface of the cross member 24. Accordingly, there is an advantage that a provision of uncomfortable feeling to the driver due to forward and backward movements of the rear portion of the rear side board 17 in a noticeable position can be effectively prevented.

Further, as shown in the above-described embodiment, in the case where the vehicle is provided with operation pedals including at least the accelerator pedal 11 and the brake pedal 12 operated by a driver and the foot rest 13 provided together, and the front portion of the front side board 15 (the toe board corresponding portion 18) is extendingly provided below the operation pedals and is provided with the avoiding portion 20 for avoiding the foot rest 13 in the front portion of the front side board 15, the setting area of the floor board 5 can be sufficiently reserved while preventing interference of the front portion of the floor board 5 with respect to the foot rest 13.

In the above-described embodiment, the rear heat duct 29 extending toward the rear side of the vehicle and passing from the side edge portion of the floor tunnel 2 to the lower side of the floor board 5. Further, in the side edge portion of the floor board 5, a notch for avoiding interference with respect to the rear heat duct 29 is formed. Accordingly, there is an advantage that interference of the side edge portion of the floor board 5 to the rear heat duct 29 can be prevented. Further, the rear heat duct 29 can be set at an appropriate value while reserving the widthwise size of the floor board 5 sufficiently.

Further, in place of the configuration where the floor board 5 is raised or lowered by transmitting a rotational drive force from the driving cable 48 of the seat driving mechanism 40 to the driving cables 33 of the raising and lowering mechanism 6, a structure in which an exclusive driving power source for raising and lowering the floor board 5 is provided may be adapted. However, in the case where it is so constructed that front and rear positions and upper and lower positions of the seat cushion 35 is adjusted by a single driving power source (driving motor) and the floor board is raised or lowered as shown in the above-described embodiment, there is an advantage a position of the seat 4 and a setting height of the floor board 5 can be adjusted simultaneously with a simple configuration.

In sum, a driving posture adjusting device comprises: a slide rail disposed in a forwardly raising posture on a floor portion of a vehicle body; a seat slider disposed in a lower front portion of a seat cushion of a driver seat and slidably supported along the slide rail; a seat driving mechanism for moving the driver seat in forward and backward directions by driving the seat slider; a guide plate formed with a guide groove of a predetermined path and fixed on the vehicle body; and a guide member provided in a rear portion of the seat cushion, the guide member including a guided portion supported along the guide groove. A rear end portion of the seat cushion is raised by sliding the guided portion along the guide groove of the guide plate in response to an operation of moving the driver seat toward a front side of the vehicle body by driving the seat slider by the seat driving mechanism.

According to the aforementioned arrangement, a rear end portion of the seat cushion is raised by sliding the guided portion along the guide groove of the guide plate in response to an operation of moving the driving seat toward a front side of the vehicle body by driving the seat slider by the seat driving mechanism. Therefore, a vision of a driver and driving operability can be properly secured in response to an operation of adjusting front and rear positions of the seat correspondingly to the physical size of a driver.

Further, it is preferable that a lower end portion of the guide plate is fixed on the slide rail, and the guide plate is supported by the floor portion of the vehicle body via the slide rail.

According to the aforementioned arrangement, a lower end portion of the guide plate is fixed on the slide rail. The slide rail is fixed on the floor portion of the vehicle body via the cross member and the like. Accordingly, the guide plate is supported by the floor portion of the vehicle body via the slide rail. Thus, a load applied from the seat cushion to the guide plate via the guide member, for example, a weight of a driver who sits on the driver seat can be stably supported by the slide rail. Further, so called a tilting mechanism including the guide plate and the guide member and the slide rail can be integrally attached to the vehicle body so that the operability can be improved effectively.

Moreover, it is preferable that the guide plate is constructed by a vertically postured plate member with a predetermined thickness. The guide groove is formed by an elongate hole perforated on the guide plate, and the guided portion is slidably supported along a lower wall portion of the guide groove.

According to the aforementioned arrangement, the guide plate is constructed by a vertically postured plate member with a predetermined thickness, and the guide groove is formed by the elongate hole perforated on the guide plate. Further, the guided portion is slidably supported along the lower wall portion of the guide groove. Therefore, a load applied from the seat cushion to the guide plate via the guide member can be stably supported so that deformation of the guide plate in response to the load can be prevented effectively. Further, by changing the shape of the elongate hole, the changing manner of a tilt angle of the seat cushion which changes correspondingly to the forward and rearward movement of the driver seat can be easily and properly changed.

Furthermore, it is preferable that the driving posture adjusting device according to the present invention further comprises an adjusting mechanism provided between a front portion of the seat cushion and the seat slider for adjusting a space therebetween.

According to the above arrangement, the adjusting mechanism is provided between the front portion of the seat cushion and the seat slider for adjusting the space therebetween. Therefore, the range of forward and backward movement of the driver seat can be prevented from becoming great while a sitting posture of the driver can be appropriately adjusted correspondingly to the height of the passenger.

This application is based on Japanese application serial no. 2006-37597 filed in Japan Patent Office on Feb. 15, 2006, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should by construed as being included therein.

What is claimed is:

1. A driving posture adjusting device comprising:
   a slide rail disposed in a forwardly raising posture on a floor portion of a vehicle body;
   a seat slider disposed in a lower front portion of a seat cushion of a driver seat and slidably supported along the slide rail;
   a seat driving mechanism for moving the driver seat in forward and backward directions by driving the seat slider;

a guide plate formed with a guide groove of a predetermined path and fixed on the vehicle body; and a guide member provided in a rear portion of the seat cushion, the guide member including a guided portion supported along the guide groove;

wherein a rear end portion of the seat cushion is raised by sliding the guided portion along the guide groove of the guide plate in response to an operation of moving the driver seat toward a front side of the vehicle body by driving the seat slider by the seat driving mechanism.

2. The driving posture adjusting device according to claim 1, wherein a lower end portion of the guide plate is fixed on the slide rail, and the guide plate is supported by the floor portion of the vehicle body via the slide rail.

3. The driving posture adjusting device according to claim 2, wherein:

the guide plate is constructed by a vertically postured plate member with a predetermined thickness, the guide groove is formed by an elongate hole perforated on the guide plate, and the guided portion is slidably supported along a lower wall portion of the guide groove.

4. The driving posture adjusting device according to claim 3, further comprising an adjusting mechanism provided between a front portion of the seat cushion and the seat slider for adjusting a space therebetween.

5. The driving posture adjusting device according to claim 2, further comprising an adjusting mechanism provided between a front portion of the seat cushion and the seat slider for adjusting a space therebetween.

6. The driving posture adjusting device according to claim 1, further comprising an adjusting mechanism provided between a front portion of the seat cushion and the seat slider for adjusting a space therebetween.

7. A driving posture adjusting device, comprising:

a slide rail disposed in a forwardly raising posture on a floor portion of a vehicle body;

a seat slider disposed in a lower front portion of a seat cushion of a driver seat and slidably supported along the slide rail;

a seat driving mechanism for moving the driver seat in a forward and backward directions by driving the seat slider;

a guide plate formed with a guide grove of a predetermined path and fixed on the vehicle body; and a guide member provided in a rear portion of the seat cushion, the guide member including a guided portion supported along the guide groove;

wherein a rear end portion of the seat cushion is raised by sliding the guided portion along the guide groove of the guide plate in response to an operation of moving the driver seat toward a front side of the vehicle body by driving the seat slider by the seat driving mechanism; and wherein said predetermined path of said guide grooves is configured in such a manner that said guide groove has a slope which slopes in a front-raised manner so that said rear end portion of a seat cushion is raised by an amount more than an amount for the front end portion of the seat cushion in response to the operation of moving the driver seat toward a front side of the vehicle body.

* * * * *